United States Patent [19]
Smithson et al.

[11] 3,872,989
[45] Mar. 25, 1975

[54] VEHICLE TRANSPORT LOADER

[76] Inventors: Howard W. Smithson, 1971 Cordilleras Ct., Redwood City, Calif. 94062; Emory L. Smithson, 8030 S.W. Oak St., Portland, Oreg. 97223; Robert L. Asburry, 3202 S.E. 165th St., Portland, Oreg. 97236

[22] Filed: Dec. 13, 1973

[21] Appl. No.: 424,423

[52] U.S. Cl. ............... 214/450, 214/85.1, 254/128
[51] Int. Cl. .............................................. B60n 9/00
[58] Field of Search ............ 214/450, 505, DIG. 10, 214/16.1 R, 16.1 ED, 85, 85.1; 254/127, 128; 296/23 B

[56] References Cited
UNITED STATES PATENTS
920,754  5/1909  Knox ................................ 254/128

| | | |
|---|---|---|
| 2,977,011 | 3/1961 | Okerlund ............................ 214/505 |
| 3,048,291 | 8/1962 | Mabry ................................ 214/450 |
| 3,128,893 | 4/1964 | Jones ................................ 214/450 |

*Primary Examiner*—Albert J. Makay
*Assistant Examiner*—Jerold M. Forsberg
*Attorney, Agent, or Firm*—Phillips, Moore, Weissenberger, Lempio & Strabala

[57]  ABSTRACT

A self-contained structure for lifting and supporting boats or other vehicles and which may be mounted on the bed of a pick-up truck or trailer for transportation is disclosed. The novel mechanism by which lifting and support for transportation and subsequent use are accomplished by the structure is described. Modifications of the structure for use in loading and transporting various vehicles are suggested.

14 Claims, 7 Drawing Figures

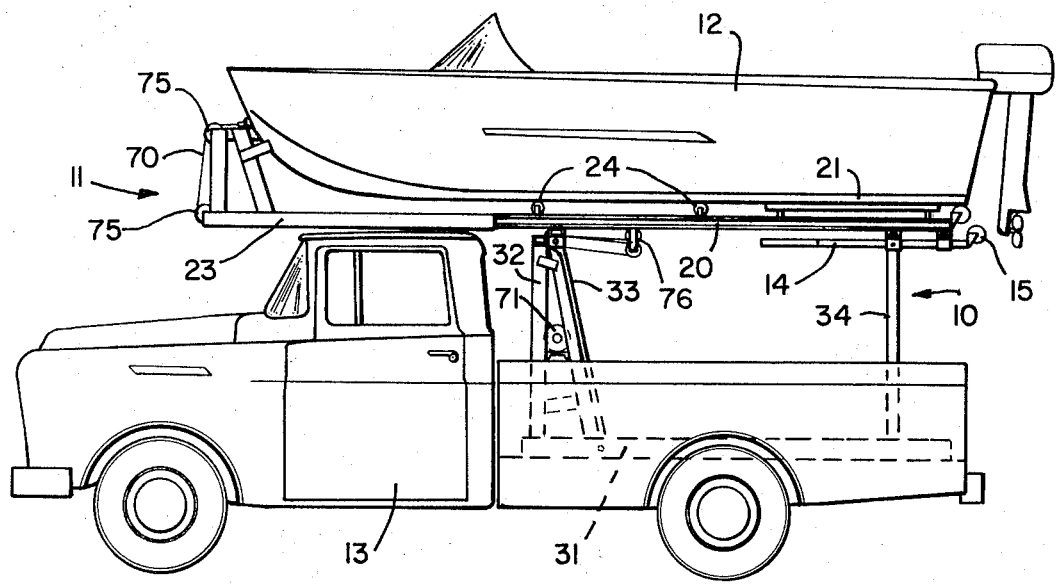
FIG_1
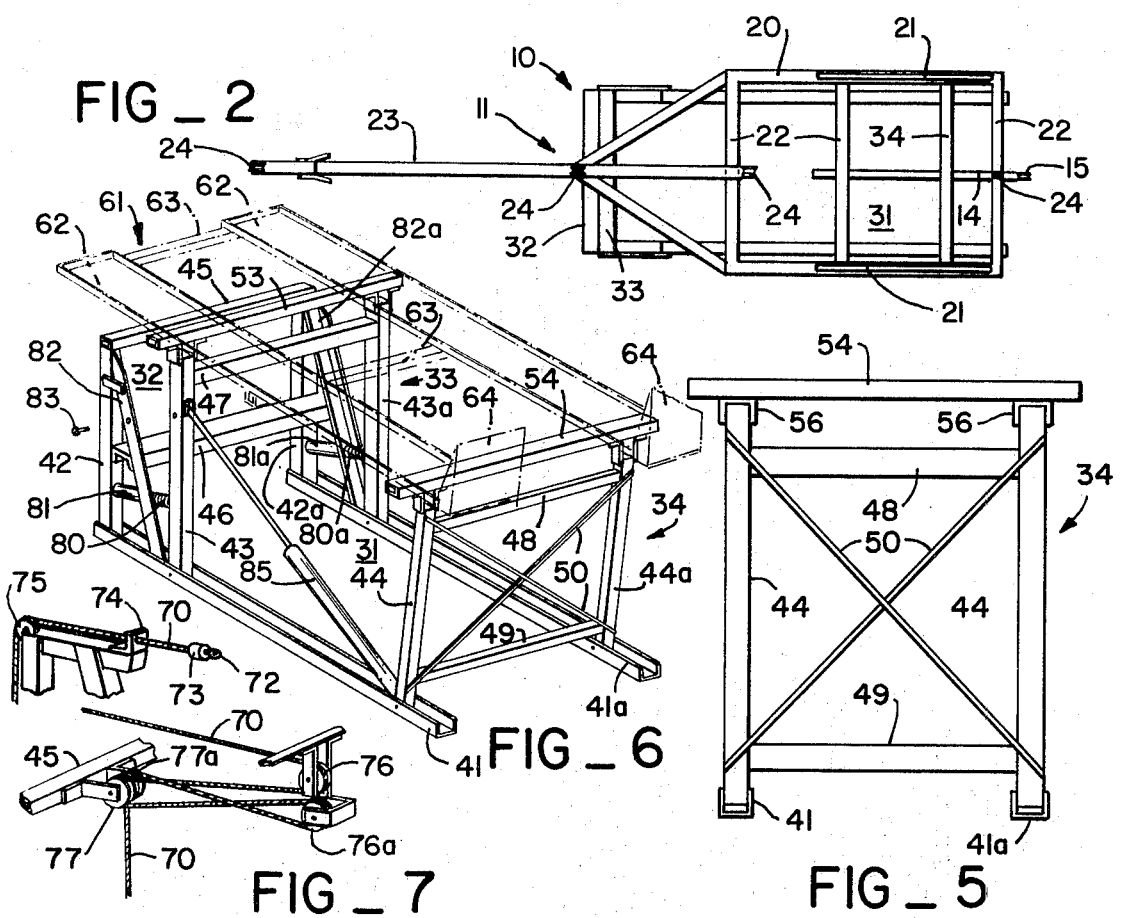
FIG_2
FIG_7
FIG_6
FIG_5

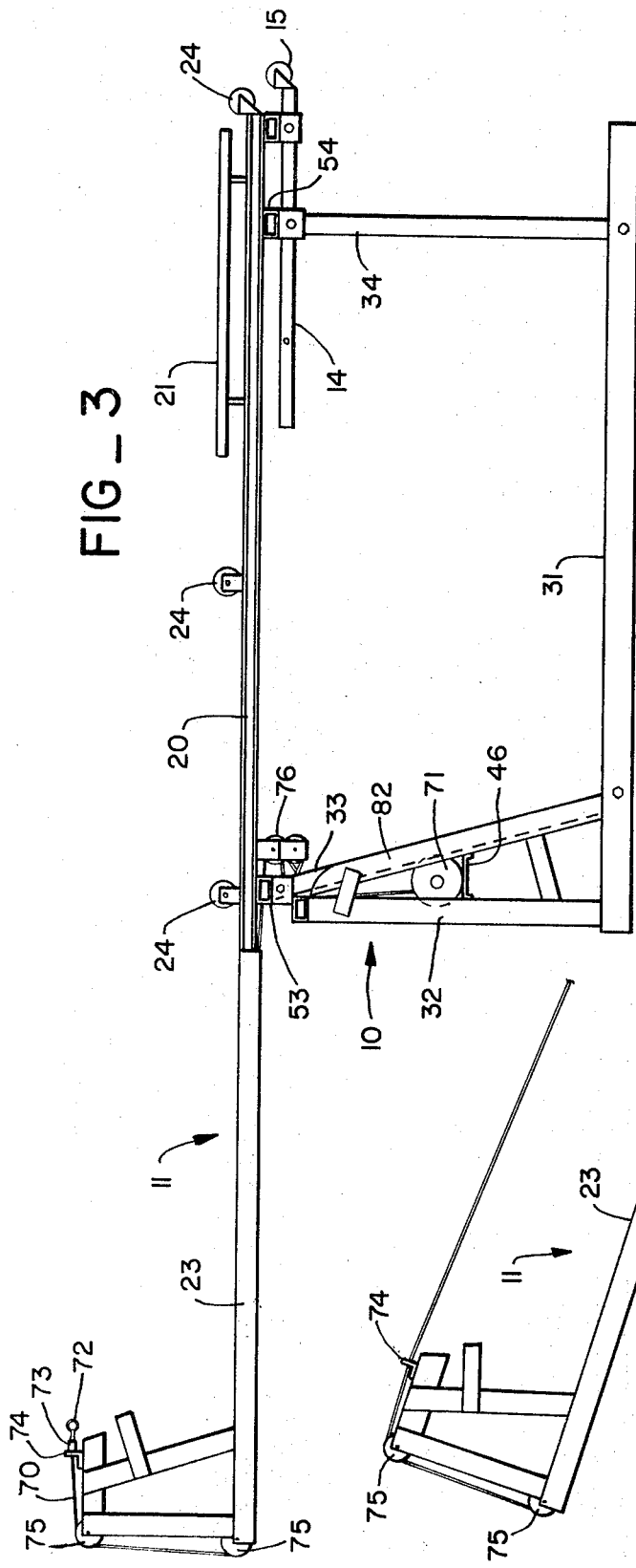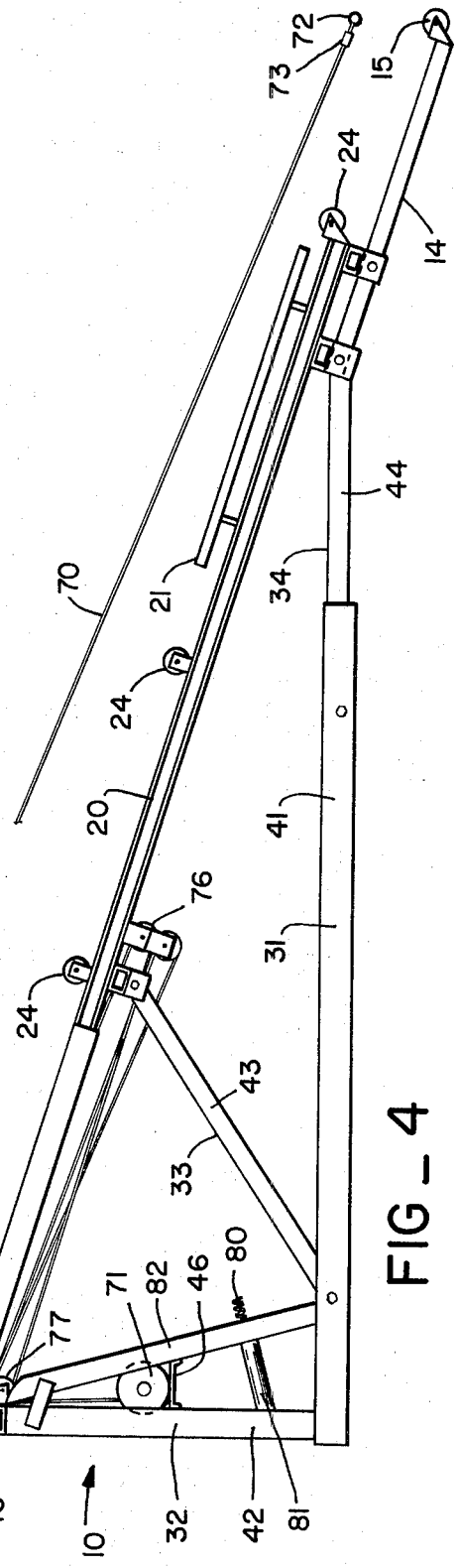

VEHICLE TRANSPORT LOADER

BACKGROUND OF THE INVENTION

This invention relates to structures for lifting and supporting vehicles such as boats and more particularly to a self-contained structure adapted to be mounted on the bed of a pick-up truck or trailer for subsequent transportation of such vehicle in its supported position.

In recent years there has been a rapid increase in the use of pleasure vehicles including boats, campers, trailers, etc., for vacation purposes. It has become common for persons to drive to a remote lake, river or sea coast taking with them not only the equipment required for living temporarily at the remote location but also additional equipment which may include a boat or other vehicle for recreational purposes.

For example, large trailers providing mobile self-contained living quarters are often pulled behind pick-up trucks into the remote area, in which case the truck itself may be used to transport additional recreational equipment. In other cases, the living quarters may be mounted on the truck to form a so-called camper or built on a truck frame to form a so-called motor home in which case a trailer may be used to transport additional recreational equipment.

It is an object of this invention to provide a self-contained structure for lifting and supporting boats or other recreational vehicle, which structure may be mounted on the bed of a truck or trailer.

There has long been a need to hoist small and medium sized boats or pleasure craft out of the water and transport them to an appropriate shelter for winter storage. U.S. Pat. No. 2,934,220 to Murphy is representative of the type of lifting frame heretofore used for this purpose.

However, such frames are not designed or intended for convenience in repeated use and transportation. Instead, they are designed for use once a year in removing the boats to nearby storage and subsequently returning them to the water.

Thus, there has been a continuing need for a means of conveniently and quickly hoisting a boat from the water and transporting it for substantial distances, often to a remote point, for re-launching in addition to merely removing the boat for storage. A variety of trailers having frames specifically designed and constructed for convenient loading, transport and launching or storage of boats have been developed.

However, such trailers are incapable of serving any other purpose than to transport the particular boat or class of boats for which they are designed. In general, it is not possible to carry miscellaneous equipment in a boat transported on such a trailer because of the danger of injury to the boat. Thus, boat trailers are a specific purpose vehicle which must be stored and maintained for a single specific use.

It is another object of this invention to provide a self-contained structure which may be removably mounted on the bed of a truck or trailer for the purpose of lifting and supporting a boat or other recreational vehicle for transportation thereon without excluding all other uses of such truck or trailer bed.

More recently it has been porposed to mount apparatus on a pick-up truck or automobile for the purpose of lifting and transporting boats as shown by U.S. Pat. No. 3,343,696 to Morrison. However, such apparatus has not been self-contained, but has incorporated structural elements of the truck or automobile. Thus, the installation of such apparatus requires structural modification of the truck or automobile and introduces the possibility of structural damage to the truck or automobile in use as well as in the installation thereof.

It is a further object of this invention to provide a self-contained structure for the purpose of lifting and supporting a boat or other recreational vehicle which may be removably mounted on the bed of a truck or trailer without relying on structural elements of such truck or trailer other than the bed thereof.

The structures heretofore proposed for lifting and supporting boats for transportation on trucks or automobiles have been mechanically unstable. Furthermore, prior art structures have not adequately provided for a danger of damage to the boat in lifting or lowering it and in transporting it on such structure.

It is yet another object of this invention to provide a self-contained structure for lifting and supporting boats and other recreational vehicles for transportation in which the vehicle is supported in a mechanically stable manner with reduced danger of damage to the vehicle in lifting and lowering it as well as in transportation and yet which can be easily operated by a single person.

SUMMARY OF THE INVENTION

Briefly, the self-contained structure for lifting and supporting boats and other recreational vehicles according to this invention comprises a rigid base frame including a first generally planar portion having elongated edges terminating in opposite ends and a second portion at one end of the first portion extending transversely of the axis of elongation of the first portion on one side thereof. A first leg structure is pivotally mounted on the first portion of the base frame at the end thereof adjacent the second portion but spaced therefrom and extends a given length to a free end. A second leg structure is pivotally mounted at the other end of the first portion of the base frame and extends a length less than the given length of the first leg structure to a free end. A rigid elongated support structure is pivotally mounted on the free ends of the leg structures and the pivotal mountings of the leg structures on the base frame and of the support structure on the free ends of the leg structures are such as to allow relative rotation of said structures about parallel axes toward and away from the second portion of the base frame. The spacing of the first leg structure from the second portion of the base frame and the difference in lengths of the leg structures being related to each other to cause the support structure to be substantially parallel to the first portion of the base frame when the first leg structure is rotated into contact with the second portion of the base frame.

BRIEF DESCRIPTION OF THE DRAWING

This invention will be more fully understood when the following detailed description of preferred embodiments thereof is read in conjunction with the drawing wherein.

FIG. 1 is a side view in elevation of a preferred embodiment of this invention mounted on the bed of a pick-up truck with a boat shown in supported position for transportation thereon.

FIG. 2 is a top plan view of the embodiment of this invention shown in FIG. 1 but omitting the truck and boat.

FIG. 3 is an enlarged side view in elevation of the embodiment of this invention as shown in FIG. 1 but omitting the truck and boat.

FIG. 4 is a view similar to FIG. 3 but with the structural elements thereof shown in fully lowered position.

FIG. 5 is an end view in elevation of the rear leg structure which may be used in embodiments of this invention.

FIG. 6 is a perspective view showing another embodiment of this invention with certain structural elements common to both embodiments shown in solid lines and structural elements specific to the further embodiment shown in dotted lines.

FIG. 7 is a fragmentary perspective view of the cable and pulley arrangement of the embodiment shown in FIGS. 1–4 and which may be used in the embodiment shown in FIG. 6.

DESCRIPTION OF THE PREFERRED EMBODIMENTS

Referring to FIG. 1, the self-contained structure designated generally by the reference numeral 10 for lifting and supporting a recreational vehicle such as boat 12 is shown mounted on the bed of a pick-up truck 13. As will be more fully explained hereinafter, the specific support or cradle structure for the boat 12 which is designated generally by the reference numeral 11 in FIG. 1 and which comprises the side support members 20 and 21, cross-members 22, bow support cradle 23 and keel rollers 24 as shown in FIG. 2 do not constitute a part of this invention although some sort of rigid, elongated, generally planar support structure suitable for supporting the vehicle to be transported is an element of this invention without regard to its specific structural features.

Referring to FIGS. 3 and 4, it will be seen that the self-contained structure according to this invention comprises a rigid base frame including an elongated generally planar first portion 31 and a second portion 32 extending on one side of the first portion 31 transversely of its axis of elongation at one end thereof. A first leg structure 33 is pivotally mounted on the first portion 31 of the base frame at the end thereof adjacent the second portion 32. A second leg structure 34 is pivotally mounted on the first portion of the base frame 31 adjacent the other end thereof. The leg structures 33 and 34 extend from one side of the first portion 31 of the base frame to free ends upon which the vehicle support structure 11 is pivotally mounted.

It will be seen that the leg structure 33 has a greater length than the leg structure 34. It will also be seen that the spacing between the second portion 32 of the base frame and the pivotal mounting of the first leg structure 33 on the first portion of the base frame as well as the relative lengths of the leg structures 33 and 34 are selected such that the vehicle support frame 11 is generally parallel to the first portion 31 of the base frame when the leg support structure 33 is rotated into contact with the first portion 32 of the base frame.

Referring to FIGS. 5 and 6, it will be seen that according to the preferred embodiment of this invention portions 31 and 32 of the base frame as well as the leg structures 33 and 34 are of open box girder steel construction consisting of tubular members, channel members, angle members and straps, for example. Such structure is not only convenient and economically practical but also tends to provide a structure having maximum strength for minimum cost and weight.

Thus, the first portion 31 of the base frame may comprise a pair of channel members 41 and 41a arranged in parallel coplanar relation with their open side facing upwardly. The second portion of the base frame may comprise a pair of tubular posts 42 and 42a each having one end welded or otherwise rigidly affixed within the channel of a different one of the members 41 and 41a at one end thereof and extending normally thereto. A tubular cross brace member 45 extending between the free ends of the post 42 and 42a is welded or otherwise rigidly fixed thereto. In order to provide greater rigidity, a second cross brace member 46 may extend between the posts 42 and 42a intermediate the ends thereof which cross brace 46 may also be welded or otherwise rigidly affixed to such posts.

Similarly, the first leg structure 33 may comprise a pair of tubular posts 43, 43a each having one end mounted within the open channel of a different one of the members 41, 41a for pivotal movement about coaxial axes normal to the axis of elongation of the members 41, 41a. Such pivotal axes are adjacent to, but spaced from, the posts 42, 42a of the second portion 32 of the base frame as will be more fully described hereinafter. A tubular cross brace member extends between the posts 43, 43a of the first leg structure 33 and is welded or otherwise rigidly affixed thereto in order to complete the leg structure 33.

Finally, the second leg structure 34 may comprise a pair of tubular posts 44 and 44a each having one end mounted in the open channel of a different one of the members 41, 41a for pivotal movement about coaxial axes normal to the axis of elongation of such members 41, 41a. A first tubular brace 48 extends between the posts 44, 44a adjacent the free ends thereof and is welded or otherwise rigidly affixed thereto.

It will be seen that the second leg structure 34 is pivotally mounted on the members 41, 41a of the first portion 31 of the base frame adjacent to, but spaced from the opposite end thereof from the posts 42, 42a of the second portion 32 of the base frame. In order to add rigidity to the base frame at such opposite end, the leg structure 34 includes a second tubular cross brace member 49 extending between the posts 44, 44a adjacent their pivotal mounting on the members 41, 41a. In addition, a pair of strap members 50 extend diagonally across the leg structure 34 and have their opposite ends welded or otherwise rigidly affixed to the respective leg members 44, 44a.

According to this embodiment of the invention a pivot structure 53 is mounted on the free end of the legs 43, 43a of the first leg structure 33 and a second identical pivot structure 54 is mounted on the free ends of the posts 44, 44a of the second leg structure 34. The pivot structures 53 and 54 may each comprise a tubular cross brace member attached to the free ends of the respective posts 43, 43a and 44, 44a of the respective leg structures 33, 34, by means of a plurality of channel segments 56 as best shown in FIG. 5.

It will be understood that the pivot structure 53 is mounted on the free ends of the posts 43, 43a for pivotal movement with respect thereto about coaxial axes which are parallel to the axes of pivotal movement of the posts 43, 43a with respect to the members 41, 41a. Similarly, the pivot structure 54 is mounted on the free ends of the posts 44, 44a for pivotal movement with respect thereto about coaxial axes which are parallel to the axes of pivotal movement of the posts 44, 44a with respect to the members 41, 41a. Thus, the pivot structures 53 and 54 provide a convenient means for mounting any desired rigid elongated support structure on the leg structures 33 and 34 in order to lift and support the desired vehicle for transportation.

Referring specifically to FIG. 6 a rigid support structure 61 suitable for enabling a wheeled vehicle such as a compact car to be lifted and supported for transportation on the self-contained structure of this invention is shown in dotted lines. Thus, a pair of rigid channel members 62, which may be interconnected by cross brace members 63, may be welded or otherwise rigidly affixed to the pivot structures 53 and 54. It will be understood that the support structure 11 of FIGS. 1 through 4 is mounted on the support structure 10 thereof in the same way.

As indicated in FIG. 6, the channel members 62 may each be provided with an extension member 64 at the end thereof adjacent the second leg structure 34. Similarly, the support structure 11 of FIGs. 1 through 4 may be provided with an extension member 14 adjacent the second leg structure 34. As will be more fully explained hereinafter the extension members 14 and 64 will enable the desired vehicle to be conveniently loaded onto the support structure from the ground or the surface of a body of water.

In accordance with the teaching of this invention and as shown in the drawing, the vehicle support structures 11 and 61 are mounted on the lifting and support structure 10 in such a way that the center of gravity of the vehicle involved is located between the leg structures 33 and 34 when the vehicle has been fully lifted and is in position for transport. Also, in accordance with this invention as pointed out hereinabove the length of the leg structure 33 is greater than the length of the leg structure 34. Such difference in length as well as the spacing of the pivotal mounting of the posts 43, 43a of the first leg structure 33 along the members 41, 41a of the first portion 31 of the base frame from the posts 42, 42a of the second portion 32 of the base frame provide two important features of the lifting and support structure 10 according to the teaching of this invention.

First, as shown in FIGS. 1 and 3 such difference in length and spacing are selected so that the second leg structure 34 is substantially perpendicular to the first portion 31 of the base frame of the structure 10 and the first leg portion 33 extends at an angle to the first portion 31 and into supported contact with the second portion 32 of the base frame of the structure 10 when the vehicle support structure 11 is in fully lifted position parallel to the first portion 31 of the base frame of the structure 10. In this position the support for the vehicle carried by the support frame 11 is extremely stable since further rotation of the leg structures 33 and 34 about their respective axes in a forward direction is prohibited by the second portion 32 of the base frame of the structure 10. In order for the leg structures 33 and 34 to rotate about their axes in a rearward direction it is necessary that the center of gravity of the vehicle 12 be raised with respect to the first portion 31 of the base frame of the structure 10. Thus, the weight of the vehicle 12 will inhibit rotational movement of the leg structures 33 and 34 in a rearward direction.

It will be seen that the forward and downward inertial forces to which the vehicle 12 is most likely to be subjected during transport will urge further rotation of the leg structures 33 and 34 in a forward direction tending to cause the vehicle 12 to be more firmly supported on the structure 10. Incidental upward and rearward inertial forces to which the vehicle 12 may be subjected during transport must first overcome the weight of the vehicle 12 before they can produce any tendency for the leg structures 33 and 34 to rotate in a rearward direction.

Secondly, such difference in length and spacing may be selected to provide a suitable loading angle for the vehicle 12 when the leg structures 33 and 34 are fully rotated in the rearward direction as most clearly shown in FIG. 4. According to the embodiment of the invention shown in the drawing, such difference in length and spacing, as well as the spacing of the pivotal mounting of the second leg structure 34 from the other end of the first portion 31 of the base frame, have been selected to cause the support frame 11 or 61 to assume an angle of about 15° with respect to the first portion 31 of the base frame of the structure 10 when the second leg structure has been rotated to the rearward extreme causing it to engage and lie in the plane of the first portion 31 of the base frame of the structure 10. In this position, the extension of the member 14 of FIGS. 1 through 4, which extension 14 may be provided with an appropriate roller 15 similar to rollers 24, will provide a continuation of the gentle incline of the support structure 11 to facilitate the loading of a boat on the support structure 11 from the surface of a body of water in which it is floating or even from the ground. Similarly, the extensions 64 of the support structure 61 shown in FIG. 6 will provide an extension of the gentle incline by which a wheeled vehicle may be loaded onto the support structure 61.

As best shown in FIGS. 3 and 4, the boat 12 or wheeled vehicle may be loaded onto the support structure 11 or 61, respectively, by means of a cable 70 which passes through an appropriate pulley means to a winch 71. According to the teaching of this invention, the pulley arrangement is such that the cable 70 and winch 71 not only pull the vehicle onto the support structure therefor, but also produce rotational movement of the leg structures 33 and 34 in a forward direction to thereby lift the vehicle after it has been fully loaded onto the support structure into the desired position for transportation thereof.

Thus, it is an important feature of this invention that the free end of the cable 70 not only be provided with an appropriate attachment means 72 by which the cable may be attached to the vehicle, but also that an appropriate tension member 73 be rigidly affixed to a point on the cable 70. The tension member 73 is adapted to engage a rigid structural member of the support structure 11 or lifting structure 10 when the vehicle 12 has been fully loaded onto the support structure 11 whereby further tension forces exerted on the cable 70 by the winch 71 will be transferred through the tension member 73 to the lifting structure 10. Such transfer of tension forces will cause forward rotation of the leg structures 33 and 34 to thereby lift the vehicle without imposing further strain on the attachment between the cable 70 and the vehicle 12.

Thus, according to the embodiment of the invention shown in FIGS. 1–4 of the drawing, the tension member 73 takes the form of a collar affixed to the cable 70 adjacent the attachment means 72 at the free end of the cable 70. The cable 70 passes through an apertured rigid structural member 74 which is welded or otherwise rigidly mounted on the bow support cradle 23 of the support structure 11 in a position to be contacted by the tension member 73 when the boat 12 has been fully loaded onto the structure 11 with its bow engaging the bow support cradle.

Referring to FIG. 7, a fragmentary view in perspective of the pulley means according to the preferred embodiment of this invention is shown. Thus, it will be seen that after passing through the apertured structural member 74, the cable 70 is passed over one or more pulley wheels 75 mounted at the forward most end of the support structure 11. The cable 70 is then passed around a pulley wheel 76 which may be mounted on the free end of the first leg structure 33 as shown in FIG. 3 or on the support structure 11 between the leg structures 33 and 34 as indicated in FIG. 1. After passing around the pulley 76 the cable 70 is passed about a pulley wheel 77 which is mounted on the free end of the second portion 32 of the base frame of the structure 10.

After passing through the pulley 77 the cable 70 may engage the winch 71. However, in the preferred embodiment of this invention shown in the drawing, the cable returns to a second pulley 76a in tandem with the pulley 76 and from there back through a second pulley 77a mounted in tandem with the pulley 77 before engaging the winch 71. This arrangement provides increased mechanical advantage for the winch 71 not only in lifting the vehicle 12 (after it has been fully received on the structure 11) by forward rotation of the leg structures 33 and 34, but also in maintaining the leg structures 33 and 34 in position against upward and rearward inertial forces exerted on the vehicle 12 during transportation thereof in fully lifted position.

It will be understood that the pulley arrangement of FIG. 7 including a winch 71 may be included in the structure shown in FIG. 6. Thus, as in FIGS. 1, 3 and 4, the winch 71 may be conveniently mounted on the middle cross brace 46 of the second portion 32 of the base frame of the lifting structure 10 of FIG. 6. The pulleys 77, and 77a may be mounted on the top cross brace 45 of the second portion 32 of the base frame of the lifting structure 10 of FIG. 6 and the pulleys 76, 76a may either be mounted on the cross brace 47 of the first leg structure 33 or on the middle cross brace 63 of the vehicle support structure 61. Finally, the pulley 75 as well as the apertured structural member 74 may be mounted on the forward most cross brace 63 of the vehicle support structure 61 of FIG. 6.

In view of the fact that the weight of the vehicle received on support structure 11 or 61 and subsequently lifted by the structure 10 will tend to maintain the vehicle in its fully lifted position, as explained above, it is necessary to overcome such effect in unloading the vehicle from the structure 10. This could be accomplished by a variety of different means but we have found that it is preferably accomplished by providing spring means adapted to resist a terminal portion of the movement of the first leg structure 33 toward the second portion 32 of the base frame.

Thus, referring to FIGS. 4 and 6, a pair of helical coil type compression springs 80, 80a may be mounted on the posts 42, 42a of the second portion 32 of the base frame so as to project therefrom toward the first leg structure 33 with their axes lying in the plane or rotational movement of the posts 43, 43a of such first leg structure 33 toward the second portion 32 of the base frame. Such springs 80, 80a may project from the first portion 32 of the base frame a sufficient distance to engage the posts 43, 43a, respectively, of the first leg structure 33 when such leg structure 33 is in a vertical position perpendicular to the first portion 31 of the base frame.

Continued rotation of the first leg structure 33 about its pivotal mounting toward the second portion 32 of the base frame under the influence of the cable 70 and winch 71, as well as the weight of the vehicle, will result in compression of the springs 80 and 80a, and the storage of potential energy therein. The springs 80, 80a may be selected so that the potential energy stored therein is sufficient to return the first leg structure 33 to a substantially vertical position against the weight of a vehicle supported thereon.

It will be understood that when the first leg structure 33 is in a substantially vertical position the second leg structure 34 will have already rotated out of its substantially vertical position, thus allowing the weight of the vehicle supported on the structure 10 to tend to result in further rearward rotation of both leg structures 33 and 34 into the position shown in FIG. 4.

The inclusion of the spring means 80, 80a will, of course, tend to make the structure 10 more sensitive to upward and rearward inertial forces exerted on the vehicle during transportation thereof. However, such forces are of far less magnitude than the forward and downward inertial forces to which the vehicle will be subjected during transportation as mentioned hereinabove. Furthermore, the cable 70 may be maintained taut in order to resist such upward and rearward inertial forces and in addition an appropriate means may be provided for locking the structure 10 in the position shown in FIG. 3 while a vehicle is being transported thereon.

Thus, as shown in FIGS. 3, 4 and 6, the second portion 32 of the base frame may be strengthened to enable it to withstand the forward and downward inertial forces exerted on the vehicle during transportation thereof through the addition of inclined angle members 82 and 82a to produce a modified "A-frame" structure in conjunction with the posts 42, 42a and the cross brace 46. The angle members 82, 82a preferably extend from the top of the respective posts 42, 42a to the channel members 41, 41a of the first portion 31 of the base frame at substantially the same angle as the angle with respect thereto formed by the first leg structure 33 when the vehicle is in its fully lifted position. Thus, the posts 43, 43a may be received by the angle members 82, 82a and an appropriate pin 83 may be passed through one or both of the angle members 82, 82a and the posts 43, 43a associated therewith in order to lock the structure 10 against upward and rearward inertial forces to which a vehicle supported thereon may be subjected during transportation.

It will be seen that the helical coil springs 80 and 80a may be conveniently received in tubular members 81, 81a extending between posts 42, 42a and angle members 82, 82a, respectively, each of the tubular members 81, 81a being aligned with an aperture through the angle member 82, 82a associated therewith and having its ends rigidly affixed to the posts 42, 42a and angle member 82, 82a associated therewith. Thus, the locking pin 83 will not only prevent the cable 70 from being subjected to the upward and rearward inertial forces exerted on the vehicle during transportation, but will also prevent the cable 70 from being subjected to the potential energy stored in the spring means 80, 80a until the pin means 83 is removed from the apertures in the angle member 82 and post 43.

From the above description, it will be seen that the cable 70 may be insulated from tension forces at all times during the transportation of a vehicle on the structure 10. It will also be seen that there is little likelihood of a rupture of the cable 70 during the time when it is subjected to tension forces in raising or lowering the vehicle received on the structure 10. However, in order to insure that a vehicle received on the structure 10 will not be damaged if the cable 70 should rupture during the lifting or lowering process, an appropriate shock absorber device 85 may be mounted between the first leg structure 33 and the first portion 31 of the base frame as shown in FIG. 6. Such shock absorber structure 85 will tend to relieve much of the strain on the cable 70 when the vehicle received on the structure 10 is being lowered and in addition will cooperate with the pin 83 in resisting upward and rearward inertial forces exerted on the vehicle during transportation.

The winch 71 may be hand-operated, however, in the preferred embodiment, the winch 71 is adapted to be operated either by hand or from a 12-volt automotive electrical system. In an embodiment of this invention actually constructed a Dutton Lainson model VLE 6000 winch capable of either manual or electrical operation was used. The rating of such winch as well as the structure of this invention was found to enable a vehicle weighing 3 tons to be lifted or lowered with a 5 to 1 safety factor.

We have found that our structure is capable of lifting, transporting and launching boats having a length up to approximately 20 feet, including either inboard or outboard motors. The structure 10 is also capable of handling most compact cars which have a length less than 20 feet through the use of an appropriate support structure 61 as shown in FIG. 6.

We have also found that a 20 foot boat transported on a pickup truck in accordance with the teaching of this invention, as shown in FIG. 1, offers less wind resistance and provides a lower center of gravity than most camper bodies when mounted on a pickup truck. In addition, the combined weight of the boat and the structure 10 in accordance with this invention will be less than the weight of most camper bodies and thus a pickup truck transporting a boat on a structure in accordance with the teaching of this invention will be safer to drive than most pickup trucks having a camper body mounted thereon.

The use of a structure in accordance with the teaching of this invention on a pickup truck has other advantages over the use of a boat trailer. For example, no additional vehicle license is required and no additional lights or light hookup is required when the structure 10 is mounted on the bed of the pickup truck. Furthermore, there is no need to find a parking place for the trailer, in addition to the truck, after the boat has been launched. Finally, the speed limit applicable when a boat is being transported on the highway by trailer is not applicable to a pickup truck transporting a boat in accordance with this invention. Obviously, a trailer could be towed behind the pickup truck transporting a boat in accordance with this invention as desired.

It will be understood that, due to the open construction of the structure 10 in accordance with this invention, most of the bed of the pickup truck will remain available for transporting a load of miscellaneous equipment in addition to the boat carried by the structure 10. However, it will also be understood that the structure 10 could be mounted on the bed of a conventional trailer, where a camper body occupies the bed of the pickup truck, for example. Again, most of the bed of the trailer would be available for the transportation of other equipment in addition to the structure 10 and boat carried thereby, and the structure 10 may be removed to enable the trailer to be used for other purposes as desired.

Whether mounted on the bed of a pickup truck or on a trailer the structure 10 has the advantage of enabling a boat to be launched without the necessity of the wheels of the truck or trailer entering the water. This avoids the adverse effects of water, particularly salt water, on the wheel bearings of the truck or trailer and insures that the lighting system of the truck or trailer will not enter the water during the launching operation.

The structure 10 should, of course, be rigidly fixed to the bed of the truck or trailer on which it is mounted. This may be accomplished by bolting the first portion 31 of the base frame (i.e., the elongated member 41, 41a) to the bed of the truck or trailer, but is preferably accomplished through the use of U-bolts (not shown) adapted to pass around a structural element of the frame of the truck or trailer with the free ends of the legs thereof passing through appropriate aligned holes (not shown) in the bed and base frame portion 31 and terminating in threaded portions secured by appropriate nuts (not shown). In any event, it will be understood that the structure 10 may be rigidly fixed to the bed of the truck or trailer by a variety of means which will not require any modification of structural elements thereof, other than the bed, thus preserving the structural integrity of the truck or trailer.

It is believed that those skilled in the art will make obvious modifications in structures disclosed herein to adapt the structure for transportation of various recreational vehicles without departing from the teaching of this invention. Specifically, it is believed that various structural techniques other than that disclosed and various other materials, such as aluminum, for example, may be used.

What is claimed is:

1. A self-contained structure for mounting on a vehicle for lifting and supporting recreational vehicles for transportation and subsequent use comprising:

a. a rigid base frame including an elongated generally planar first portion having opposite ends joined by opposite elongated edges and a second portion at one end of said first portion extending on one side of said first portion transversely of the axis of elongation thereof;

b. a first leg structure pivotally mounted on said first portion of said base frame at a point adjacent said one end thereof and spaced from said second portion along said axis of elongation of said base frame, said first leg structure extending transversely of said axis of elongation of said first portion a given length to a free end spaced from said one side of said first portion of said base frame;

c. a second leg structure pivotally mounted on said first portion of said base frame adjacent the other end thereof, said second leg structure extending transversely of said axis of elongation of said first portion of said base frame a length less than said given length to a free end spaced from said one side of said first portion of said base frame;

d. a rigid elongated generally planar support structure pivotally mounted on said free ends of said first and second leg structures;

e. said pivotal mounting of said leg structures on said first portion of said base frame and of said support structure on said free ends of said first and second leg structures being such as to allow rotation about parallel axes toward and away from said second portion of said base member, said spacing of said first leg structure from said second portion of said base member and the difference in lengths of said leg structures being related to each other to cause said generally planar support structure to be substantially parallel to said generally planar first portion of said base frame when said first leg structure is in contact with said second portion of said base frame;

f. said elongated edges of said first portion of said base frame comprising a pair of elongated channel members parallel to each other in a common plane, said second portion of said base frame comprising a pair of posts each having one end rigidly affixed to a different one of said elongated channel members and extending in a common plane on one side of said elongated channel members transverse to the axis of elongation thereof and including means rigidly connecting the free ends of said posts to each other, and each of said first and second leg structures comprising a pair of posts with one post of each pair pivotally mounted at one end on a different one of said elongated channel members, each pair of posts extending in a common plane on said one side of said elongated channel members, and each of said first and second leg structures including means mechanically coupling the free ends of said pair of posts thereof to each other.

2. A self-contained structure as claimed in claim 1 wherein said means mechanically coupling the free ends of said pair of posts of each of said first and second leg structures includes a rigid brace member rigidly affixed therebetween.

3. A self-contained structure as claimed in claim 1 wherein said means mechanically coupling the free ends of said pair of posts of each of said first and second leg structures includes a rigid brace member pivotally mounted thereon at said free ends.

4. A self-contained structure as claimed in claim 1 wherein a winch means is mounted on said base frame, a first pulley means is mounted at the free end of said second portion of said base frame, a second pulley means is mechanically coupled to the free end of said first leg structure, a third pulley means is mounted on said elongated generally planar support structure and a cable means adapted to be wound on said winch means extends from said winch means through said first, second and third pulley means in that order terminating in a free end adapted to be attached to said recreational vehicle, said cable member having sufficient length to be attached to said recreational vehicle when spaced from said self-contained structure.

5. A self-contained structure as claimed in claim 4 including an apertured rigid structural member mechanically coupled to said first leg structure through which said cable member is passed after leaving said third pulley means and a tension means affixed to said cable member adjacent the free end thereof and adapted to engage said apertured rigid structural member when said cable member is wound on said winch.

6. A self-contained structure as claimed in claim 4 wherein said second pulley means is rigidly mounted on said elongated generally planar support structure at the end thereof adjacent said second portion of said base frame.

7. A self-contained structure as claimed in claim 5 wherein said apertured rigid structural member is rigidly mounted on said elongated generally planar support structure at the end thereof adjacent said second portion of said base frame.

8. A self-contained structure as claimed in claim 1 wherein said second portion of said base frame includes a pair of rigid angle members each having one end rigidly mounted on a different one of said elongated channel members adjacent the pivotal mounting of said first leg structure thereon and the other end rigidly connected to the associated post of said second portion of said base frame adjacent the free end thereof.

9. A self-contained structure as claimed in claim 1 including spring means mounted on said second portion of said base frame and adapted to resist a terminal portion of the pivotal movement of said first leg structure toward said second portion of said base frame.

10. A self-contained structure as claimed in claim 1 including means for locking said first leg structure in contact with said second portion of said base frame.

11. A self-contained structure as claimed in claim 1 including shock absorber means for resisting pivotal movement of said first leg structure away from contact with said second portion of said base frame.

12. A self-contained structure as claimed in claim 1 including stop means for limiting pivotal movement of said first and second leg structures away from said second portion of said base frame.

13. A self-contained structure as claimed in claim 12 wherein the position of said stop means and said difference in length of said leg structures are related to each other to cause said generally planar support structure to form an angle of less than 30° with respect to said planar first portion of said base frame when said stop means is engaged by pivotal movement of said first and second leg structures away from said second portion of said base frame.

14. A self-contained structure as claimed in claim 1 wherein said second leg structure is substantially perpendicular to said first portion of said base frame when said first leg structure is in contact with said second portion of said base frame.

* * * * *